(12) United States Patent
Bays

(10) Patent No.: US 11,688,985 B2
(45) Date of Patent: Jun. 27, 2023

(54) ELECTRICAL INTERCONNECT SYSTEM FOR AN ELECTRIC VEHICLE

(71) Applicant: Cummins Inc., Columbus, IN (US)

(72) Inventor: Mark N. Bays, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 130 days.

(21) Appl. No.: 17/314,299

(22) Filed: May 7, 2021

(65) Prior Publication Data

US 2022/0360032 A1    Nov. 10, 2022

(51) Int. Cl.
*H01R 31/02* (2006.01)
*H01R 31/06* (2006.01)
*B60R 16/03* (2006.01)
*B60R 16/02* (2006.01)

(52) U.S. Cl.
CPC ......... *H01R 31/02* (2013.01); *B60R 16/0207* (2013.01); *B60R 16/03* (2013.01); *H01R 31/06* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 3,909,566 A * | 9/1975 | Morrison | H01R 13/453 439/131 |
| 4,109,989 A * | 8/1978 | Snyder, Jr. | H01R 13/5221 439/140 |
| 4,134,045 A * | 1/1979 | Quin | H02G 3/00 439/502 |
| 4,399,371 A * | 8/1983 | Ziff | H02G 3/00 439/95 |
| 4,445,739 A * | 5/1984 | Wooten | H01R 13/4538 439/140 |
| 4,500,796 A * | 2/1985 | Quin | H05B 47/175 307/157 |
| 4,593,960 A * | 6/1986 | Millhimes | H01R 13/447 439/131 |
| 4,743,714 A * | 5/1988 | Chien | H01H 13/74 200/5 E |
| 5,340,331 A * | 8/1994 | Bohlen | H01R 31/02 439/502 |
| 6,422,884 B1 * | 7/2002 | Babasick | H01R 13/5812 439/470 |
| 6,531,657 B1 * | 3/2003 | Jones, Jr. | H01R 31/06 439/502 |
| 6,867,382 B2 * | 3/2005 | Hoffman | H01R 13/514 200/61.7 |
| 6,948,972 B2 * | 9/2005 | Laukhuf | H01R 13/641 439/490 |
| 9,929,561 B2 * | 3/2018 | Georgopapadakos | H02J 1/12 |
| 10,277,330 B2 * | 4/2019 | Sipes, Jr. | H04N 21/4436 |
| 10,707,618 B2 * | 7/2020 | Leigh | H01R 13/6315 |

(Continued)

FOREIGN PATENT DOCUMENTS

| | | | | |
|---|---|---|---|---|
| TW | M351498 U | 2/2009 | | |
| WO | WO-2016184613 A1 * | 11/2016 | | B62M 6/55 |

*Primary Examiner* — Timothy J. Dole
*Assistant Examiner* — Muhammed Azam
(74) *Attorney, Agent, or Firm* — Faegre Drinker Biddle & Reath LLP

(57) ABSTRACT

A modular electrical interconnect system for coupling electrical components of an electric vehicle. The interconnects include connectors configured to be coupled to one another to form a bus.

20 Claims, 7 Drawing Sheets

(56) References Cited

U.S. PATENT DOCUMENTS

| | | | |
|---|---|---|---|
| 10,749,301 B2* | 8/2020 | Matsui | H01R 13/506 |
| 10,819,060 B2* | 10/2020 | Tsukiyoshi | H01R 13/506 |
| 2002/0111048 A1* | 8/2002 | Kondoh | B60R 16/0207 |
| | | | 439/34 |
| 2004/0055858 A1* | 3/2004 | Hoffman | H01R 13/514 |
| | | | 200/61.62 |
| 2006/0234544 A1* | 10/2006 | Chen | H01R 27/02 |
| | | | 439/502 |
| 2007/0202753 A1* | 8/2007 | Murakami | H01R 31/08 |
| | | | 439/701 |
| 2007/0218736 A1* | 9/2007 | Takizawa | H01R 13/187 |
| | | | 439/247 |
| 2010/0319956 A1* | 12/2010 | Ballard | H01B 9/003 |
| | | | 174/105 R |
| 2013/0102195 A1* | 4/2013 | Pocrass | H01R 27/02 |
| | | | 439/620.23 |
| 2013/0303024 A1* | 11/2013 | Rapp | H01R 13/6633 |
| | | | 439/620.21 |
| 2014/0300182 A1* | 10/2014 | James | B60R 16/03 |
| | | | 307/10.1 |
| 2015/0137918 A1* | 5/2015 | Weber | H01R 31/02 |
| | | | 335/202 |
| 2019/0061656 A1* | 2/2019 | Tait | B60N 2/99 |

\* cited by examiner

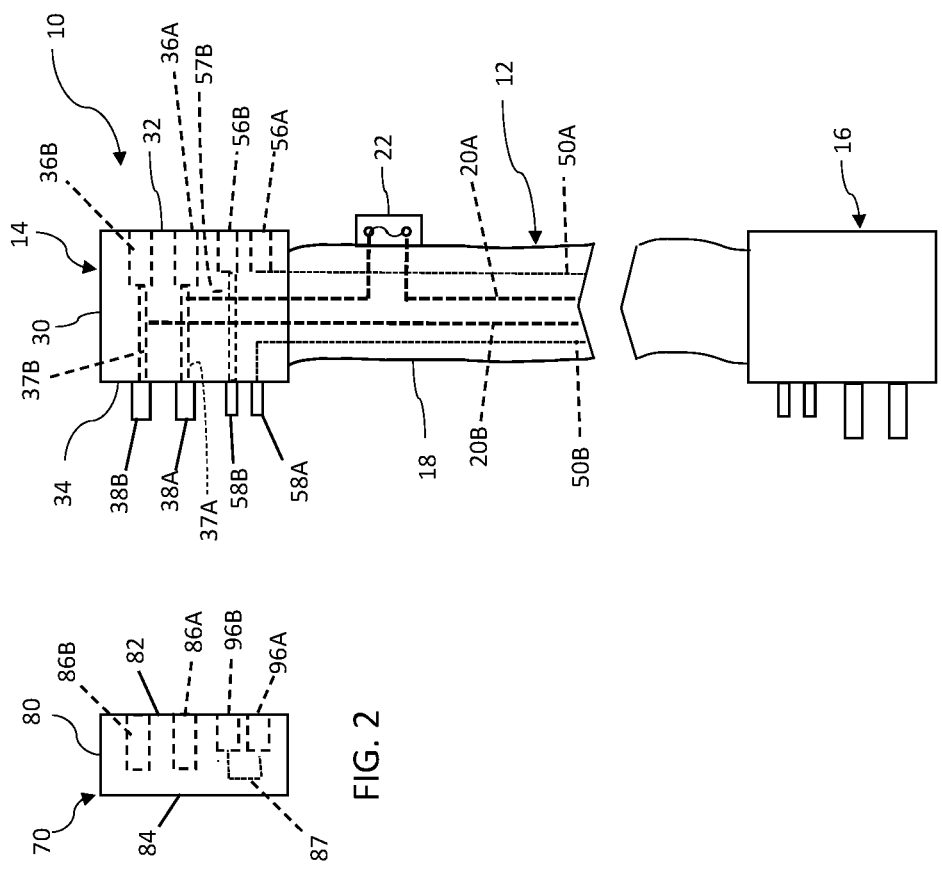

ELECTRICAL INTERCONNECT SYSTEM FOR AN ELECTRIC VEHICLE

FIELD

This disclosure relates generally to electric vehicles. In particular, this disclosure relates to electric interconnect systems including connectors, cables and buses for coupling electrical components of such vehicles.

BACKGROUND

Electric vehicles include relatively large numbers electrical components that are connected by electrical interconnects. Examples of such components include batteries, traction motors, fuel cells, hydraulic pumps and compressors. The electrical interconnects couple electrical power between these components.

There remains a continuing need for improved electric vehicle interconnect systems. In particular, there is a need for electrical interconnect systems that can enhance the efficiency by which the vehicles are manufactured.

SUMMARY

Disclosed embodiments include modular electrical interconnects and electric vehicle electrical systems with components coupled to a bus including a plurality of the interconnects.

One example includes one or more electrical interconnects for coupling electrical components in an electric vehicle. Each of the electrical interconnects may comprise: a cable including first and second ends and first and second power conductors; and a first connector on the first end of the cable, the first connector including: a body having first and second sides; first and second first side power terminals on the first side of the body; and first and second second side power terminals on the second side of the body, wherein the first second side power terminal is electrically coupled to the first first side power terminal and to the first power conductor, and the second second side power terminal is electrically coupled to the second first side power terminal and to the second power conductor; and wherein the first side of the body and the first and second first side power terminals are complimentary to the second side of the body and the first and second second side power terminals so the first connector is configured to be mechanically and electrically connected to a first connector of another of the electrical interconnects on one or both of the first or second sides of the body. Embodiments include a set of a plurality of the electrical interconnects, where two or more of the plurality of electrical interconnects comprise cables having different lengths.

In embodiments, each of the electrical interconnects further comprises a second connector on the second end of the cable. The second connector may include: a body having first and second sides; first and second first side power terminals on the first side of the body; and first and second second side power terminals on the second side of the body, wherein the first second side power terminal is electrically coupled to the first first side power terminal and to the first power conductor, and the second second side power terminal is electrically coupled to the second first side power terminal and to the second power conductor; and wherein the first side of the body and the first and second first side power terminals are complimentary to the second side of the body and the first and second second side power terminals so the second connector is configured to be mechanically and electrically connected to a first connector of another of the electrical interconnects on one or both of the first or second sides of the body. Embodiments include a set of a plurality of the electrical interconnects, where two or more of the plurality of electrical interconnects comprise cables having different lengths.

In embodiments, for one or more of the electrical interconnects, the cable further includes first and second interlock conductors. The first connecter may further include: a first first side interlock terminal on the first side of the body and electrically coupled to the first interlock conductor; and a first second side interlock terminal on the second side of the body and electrically coupled to the second interlock conductor; and wherein the first first side interlock terminal of the first connector is complimentary to the first second side interlock terminal of the first connector. The second connector further includes: a first first side interlock terminal on the first side of the body and electrically coupled to the first interlock conductor; and a first second side interlock terminal on the second side of the body and electrically coupled to the second interlock conductor; and wherein the first first side interlock terminal of the second connector is complimentary to the first second side interlock terminal of the second connector. Embodiments include a set of a plurality of the electrical interconnects, where two or more of the plurality of electrical interconnects comprise cables having different lengths.

Embodiments may further comprise one or more end caps. Each end cap may be configured to be mounted to the second side of the body of one or both of the first and second connectors. Each end cap may include: a body having first and second opposite sides; a first interlock terminal on the first side of the body, wherein the first interlock terminal is located to electrically couple to the first second side interlock terminal of one or both of the first or second connectors; and a second interlock terminal on a second side of the body and electrically coupled to the first interlock terminal.

In embodiments, for one or more of the electrical interconnects, the first connector may further include: a second first side interlock terminal on the first side of the body; and a second second side interlock terminal on the second side of the body and electrically coupled to the second first side interlock terminal; and wherein the second first side interlock terminal of the first connector is complimentary to the second second side interlock terminal of the first connector. The second connector may further include: a second first side interlock terminal on the first side of the body; and a second second side interlock terminal on the second side of the body and electrically coupled to the second first side interlock terminal; and wherein the second first side interlock terminal of the second connector is complimentary to the second second side interlock terminal of the second connector. Embodiments include a set of a plurality of the electrical interconnects, where two or more of the plurality of electrical interconnects comprise cables having different lengths.

In embodiments, one or more of the electrical interconnects further comprises one or more end caps, each end cap configured to be mounted to the second side of the body of one or both of the first and second connectors. Each end cap may include: a body having first and second opposite sides; a first interlock terminal on the first side of the body, wherein the first interlock terminal is located to electrically couple to the first second side interlock terminal of one or both of the first or second connectors; and a second interlock terminal on the first side of the body and electrically coupled to the first interlock terminal, wherein the second interlock terminal is located to electrically couple to the second second side interlock terminal of one or both of the first or second connectors.

In embodiments, for one or more of the electrical interconnects, the cable further includes first and second interlock conductors. The first connecter may further include: a first first side interlock terminal on the first side of the body and electrically coupled to the first interlock conductor; and a first second side interlock terminal on the second side of the body and electrically coupled to the second interlock conductor; and wherein the first first side interlock terminal of the first connector is complimentary to the first second side interlock terminal of the first connector. The second connector may further include: a first first side interlock terminal on the first side of the body and electrically coupled to the first interlock conductor; and a first second side interlock terminal on the second side of the body and electrically coupled to the second interlock conductor; and wherein the first first side interlock terminal of the second connector is complimentary to the first second side interlock terminal of the second connector. Embodiments include a set of a plurality of the electrical interconnects, where two or more of the plurality of electrical interconnects comprise cables having different lengths.

In embodiments, for one or more of the electrical interconnects, the first connector may further include: a second first side interlock terminal on the first side of the body; and a second second side interlock terminal on the second side of the body and electrically coupled to the second first side interlock terminal; and wherein the second first side interlock terminal of the first connector is complimentary to the second second side interlock terminal of the first connector. The second connector may further include: a second first side interlock terminal on the first side of the body; and a second second side interlock terminal on the second side of the body and electrically coupled to the second first side interlock terminal; and wherein the second first side interlock terminal of the second connector is complimentary to the second second side interlock terminal of the second connector. Embodiments include a set of a plurality of the electrical interconnects of claim 13, where two or more of the plurality of electrical interconnects comprise cables having different lengths.

Another example is an electrical system for an electric vehicle, comprising: a plurality of vehicle electrical components; and one or more electrical interconnects connected to each of the plurality of vehicle electrical components. Each of the electrical interconnects comprises: a cable including first and second ends and first and second power conductors; and a first connector on the first end of the cable. The first connector may include: a body having first and second sides; first and second first side power terminals on the first side of the body; and first and second second side power terminals on the second side of the body, wherein the first second side power terminal is electrically coupled to the first first side power terminal and to the first power conductor, and the second second side power terminal is electrically coupled to the second first side power terminal and to the second power conductor; and wherein the first side of the body and the first and second first side power terminals are complimentary to the second side of the body and the first and second second side power terminals so the first connector is configured to be mechanically and electrically connected to a first connector of another of the electrical interconnects on one or both of the first or second sides of the body; and wherein at least some of the electrical components are coupled to a bus including a plurality of the first connectors mechanically and electrically connected to one another. In embodiments, at least some of the electrical interconnects have cables of different lengths.

In embodiments, at least some of the one or more electrical interconnects comprises a second connector on the second end of the cable. The second connector may include: a body having first and second sides; first and second first side power terminals on the first side of the body; and first and second second side power terminals on the second side of the body, wherein the first second side power terminal is electrically coupled to the first first side power terminal and to the first power conductor, and the second second side power terminal is electrically coupled to the second first side power terminal and to the second power conductor; and wherein the first side of the body and the first and second first side power terminals are complimentary to the second side of the body and the first and second second side power terminals so the second connector is configured to be mechanically and electrically connected to a first connector of another of the electrical interconnects on one or both of the first or second sides of the body; and wherein at least some of the electrical components are coupled to a bus including a plurality of the second connectors mechanically and electrically connected to one another.

In embodiments, for at least some of the electrical interconnects, the cable further includes first and second interlock conductors. The first connecter may further include: a first first side interlock terminal on the first side of the body and electrically coupled to the first interlock conductor; and a first second side interlock terminal on the second side of the body and electrically coupled to the second interlock conductor; and wherein the first first side interlock terminal of the first connector is complimentary to the first second side interlock terminal of the first connector. The second connector may further include: a first first side interlock terminal on the first side of the body and electrically coupled to the first interlock conductor; and a first second side interlock terminal on the second side of the body and electrically coupled to the second interlock conductor; and wherein the first first side interlock terminal of the second connector is complimentary to the first second side interlock terminal of the second connector.

In embodiments, for at least some of the electrical interconnects the first connector further includes: a second first side interlock terminal on the first side of the body; and a second second side interlock terminal on the second side of the body and electrically coupled to the second first side interlock terminal; and wherein the second first side interlock terminal of the first connector is complimentary to the second second side interlock terminal of the first connector. The second connector may further include: a second first side interlock terminal on the first side of the body; and a second second side interlock terminal on the second side of the body and electrically coupled to the second first side interlock terminal; and wherein the second first side interlock terminal of the second connector is complimentary to the second second side interlock terminal of the second connector. In embodiments, at least some of the electrical interconnects have cables of different lengths.

BRIEF DESCRIPTION OF THE DRAWINGS

FIG. 1 is a diagrammatic illustration of an electrical interconnect in accordance with embodiments.

FIG. 2 is a diagrammatic illustration of an end cap in accordance with embodiments.

DETAILED DESCRIPTION

Figure 3:
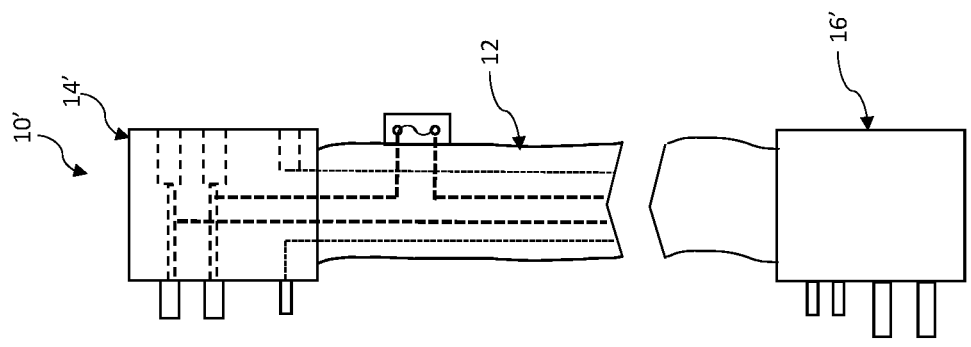
FIG. 3 is a diagrammatic illustration of an electrical interconnect in accordance with embodiments.

FIG. 1 is a diagrammatic illustration of an electrical interconnect 10 in accordance with embodiments. The illustrated embodiments of the interconnect 10 include a cable 12, a first connector 14 on a first end of the cable, and a second connector 16 on a second end of the cable. Cable 12, which may comprise any suitable conventional or otherwise known configuration, includes a housing 18, typically of insulating material, enclosing a plurality of power conductors 20A and 20B. Although two power conductors 20A and 20B are shown for purposes of example in FIG. 1, other embodiments may include more or fewer such conductors. A fuse 22 is coupled to the power conductor 22A in a conventional or otherwise known matter in the embodiments illustrated in FIG. 1. Other embodiments of interconnect 10 may not include a fuse.

As described in greater detail below, connectors 14 and 16 provide a mechanism by which the power conductors 20A and 20B of the cable 12 may be electrically connected to electrical components of an electric vehicle (not shown in FIG. 1). As also described in greater detail below, the connectors 14 and 16 are configured to be connected to one other, or stacked, to form a bus. The illustrated embodiments of connector 14 (e.g., a first connector) include a body 30 mounted to the end of the cable 12. Body 30 includes a first side 32 and a second side 34. Although the first side 32 and second side 34 are opposite one another and shown as generally planar in the illustrated embodiments, the sides 32 and 34 may have other configurations in other embodiments. The body 30 may comprise any of one or more suitable conventional or otherwise known materials, including polymer insulating materials.

Located on the first side 32 of the body 30 are first power terminal 36A and second power terminal 36B (e.g., first and second first side power terminals). Located on the second side 34 of the body 30 are first power terminal 38A and second power terminal 38B (e.g., first and second second side power terminals). The first power terminal 36A and first power terminal 38A are electrically coupled to one another, for example by the body conductor 37A in the body 30, and are electrically coupled to the first power conductor 20A of the cable 12. Similarly, the second power terminal 36B and second power terminal 38B are electrically coupled to one another, for example by the body conductor 37B, and are electrically coupled to the second power conductor 20B of the cable 12. The number of power terminals such as 36A, 36B, 38A, 38B corresponds to the number of power conductors such as 20A, 20B in the cable 12. For example, embodiments including three power conductors (not shown) may have a third power terminal on each of the first and second sides of the body.

The first power terminal 36A and the first power terminal 38A are complimentary in that they are configured to be able to mate or otherwise be electrically coupled to one other. Similarly, the second power terminal 36B and the second power terminal 38B are complimentary in that they are configured to be able to mate or otherwise be electrically coupled to one another. In the illustrated embodiments the first and second power terminals 38A and 38B on the second side 34 of the body 30 are shown as prong- or male-type members extending from the second side, and the first and second power terminals 36A and 36B on the first side 32 of the body are shown as receptacle- or female-type members extending into the first side. In embodiments of these types the first and second power terminals 36A and 36B are configured to mechanically receive and mate with, and to electrically couple to, the first and second power terminals 38A and 38B (e.g., the terminals 38A, 38B can be plugged into the terminals 36A and 36B). The first and second sides 32 and 34 of the body are complimentary in that they are configured to enable the mechanical and electrical coupling of the first and second power terminals 36A and 36B with the first and second power terminals 38A and 38B, respectively. Other embodiments include other types of terminals 36A, 36B, 38A, 38B that provide the mating and electrical coupling functionality of those described above in connection with FIG. 1. For example, the terminals 36A, 36B, 38A, 38B may spring or otherwise biased members configured to engage one another. In these or other embodiments (not shown) terminals 36A and 38A may be identical to one another, and terminals 36B and 38B may be identical to one another.

The illustrated embodiments of the cable 12 and connector 14 are configured as internal return, high voltage interlock loop (HVIL) devices. As shown, HVIL structures of the cable 12 include first and second interlock conductors 50A and 50B enclosed within the housing 18. HVIL structures of the connector 14 include a first interlock terminal 56A and a second interlock terminal 56B on the first side 32 of the body 30 (i.e., first and second first side interlock terminals), and a first interlock terminal 58A and a second interlock terminal 58B on the second side 34 of the body (i.e., first and second second side interlock terminals). The first interlock terminal 56A on the first side 32 of the body 30 is electrically coupled to the first interlock conductor 50A. The first interlock terminal 58A on the second side 34 of the body 30 is electrically coupled to the second interlock conductor 50B. The second interlock terminal 56B on the first side 32 and the second interlock terminal 58B on the second side 34 are electrically coupled to one another, for example by the body conductor 57B in the body 30.

The first interlock terminal 56A and the first interlock terminal 58A are complimentary in that they are configured to be able to mate or otherwise be electrically coupled to one other. Similarly, the second interlock terminal 56B and the second interlock terminal 58B are complimentary in that they are configured to be able to mate or otherwise be electrically coupled to one another. In the illustrated embodiments, the first and second interlock terminals 58A and 58B on the second side 34 of the body 30 are shown as prong- or male-type members extending from the second side, and the first and second interlock terminals 56A and 56B on the first side 32 of the body are shown as receptacle- or female-type members extending into the first side. In embodiments of these types the first and second interlock terminals 56A and 56B are configured to mechanically receive and mate with, and to electrically couple to, the first and second interlock terminals 58A and 58B (e.g., the terminals 58A, 58B can be plugged into the terminals 56A and 56B). The first and second sides 32 and 34 of the body 30 are complimentary in that they are configured to enable the mechanical and electrical coupling of the first and second interlock terminals 56A and 56B with the first and second interlock terminals 58A and 58B, respectively. Other embodiments include other types of terminals 56A, 56B, 58A, 58B that provide the mating and electrical coupling functionality of those described above in connection with FIG. 1. For example, the terminals 56A, 56B, 58A, 58B may spring or otherwise biased members configured to engage one another. In these or other embodiments (not shown) terminals 56A and 58A may be identical to one another, and terminals 56B and 58B may be identical to one another.

Connector 16 may be structurally identical or similar to the connector 14, and its components may be electrically coupled to the conductors 20A, 20B, 50A and 50B in the cable 18 in same manner as those of the connector 14. Other embodiments include other connectors 16 (not shown).

FIG. 2 is a diagrammatic illustration of embodiments of an end cap 70 configured for use with the internal return HVIL connector 14 (e.g., an internal return end cap). As shown, the end cap 70 includes a body 80 having a first side 82 and a second side 84. The body 80 may comprise any of one or more suitable conventional or otherwise known materials, including insulating materials. Located on the first side 82 of the body 80 are first power terminal structure 86A and second power terminal structure 86B. Also located on the first side 82 of the body 80 are first interlock terminal 96A and second interlock terminal 96B. The first interlock terminal 96A and the second interlock terminal 96B are electrically coupled to one another, for example by the body conductor 87 in the body 80.

As described in greater detail below, end cap 70 is configured to be connected to a connector such as 14 at an end of a bus formed by one or more of the connectors such as 14. In the illustrated embodiments, the first side 82 of the end cap 70 is configured to mate and be coupled to the second side 34 of the connector 14. To facilitate this functionality, the first power terminal structure 86A of the end cap 70 and the first power terminal 38A on the second side 34 of the body 30 of the connector 14 are complimentary in that the end cap is able to accommodate the first power terminal 38A of the connector 14 when the end cap is mechanically mated or joined to the connector. Similarly, the second power terminal structure 86B of the end cap 70 and the second power terminal 38B of the connector 14 are complimentary in that the end cap is able to accommodate the second power terminal 38B of the connector 14 when the end cap is mechanically mated or joined to the connector. In the illustrated embodiments, for example, the first and second power terminal structures 86A and 86B are recesses in the body 80 of the end cap 70 that are sized to receive the first and second power terminals 38A and 38B, respectively. The first side 82 of the body 80 of the end cap 70 and the second side 34 of the body 30 of the connector 14 are complimentary in that they are configured to enable the mechanical coupling of the first and second power terminal structures 86A and 86B of the end cap 70 with the first and second power terminals 38A and 38B, respectively of the connector 14. In other embodiments (not shown) the first and second power terminal structures 86A and 86B have other configurations.

The first interlock terminal 96A of the end cap 70 and the first interlock terminal 58A on the second side 34 of the body 30 of the connector 14 are complimentary in that they are configured to be able to mate or otherwise be electrically coupled to one another when the end cap is mechanically mated or joined to the connector. Similarly, the second interlock terminal 96B of the end cap 70 and the second interlock terminal 58B of the connector 14 are complimentary in that they are configured to be able to mate or otherwise be electrically coupled to one another when the end cap is mechanically mated or joined to the connector. In the illustrated embodiments, for example, the first and second interlock terminals 96A and 96B are shown as receptacle- or female-type members extending into the first side 82 of the end cap 70. In embodiments of these types the first and second interlock terminals 96A and 96B of the end cap 70 are configured to mechanically receive and mate with, and to electrically couple to, the first and second interlock terminals 58A and 58B of the connector 14 (e.g., the terminals 58A, 58B can be plugged into the terminals 96A and 96B). The first side 82 of the body 80 of the end cap 70 and the second side 34 of the body 30 of the connector 14 are complimentary in that they are configured to enable the mechanical and electrical coupling of the first and second interlock terminals 96A and 96B of the end cap 70 with the first and second power terminals 58A and 58B, respectively of the connector 14.

FIG. 3 is a diagrammatic illustration of a cable 12 and an external return HVIL connector 14' in accordance with embodiments. As shown, the connector 14' may be substantially the same as or similar to the connector 14 described above in connection with FIGS. 1 and 2, but does not include internal HVIL return components of features such as the terminals 56B and 58B and the body connector 57B associated with the internal HVIL return functionality. Similar reference numbers are used in FIG. 3 to identify features of the connector 14' that are similar to or the same as corresponding features of the connector 14. For example, second connector 16' may be substantially the same as or similar to second connector 16 as described above in connection with FIGS. 1 and 2.

Figure 4:
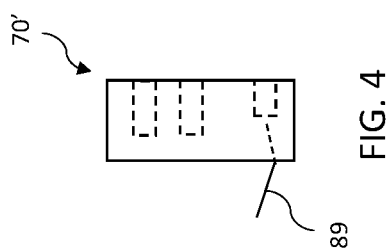
FIG. 4 is a diagrammatic illustration of an end cap in accordance with embodiments.

FIG. 4 is a diagrammatic illustration of an external return HVIL end cap 70' in accordance with embodiments. End cap 70' is configured for use with external return HVIL connectors such as 14'. As shown, end cap 70' may be substantially the same as or similar to the end cap 70 described above in connection with FIG. 2, but does not include the components or features associated with the internal HVIL return functionality such as the second interlock terminal 96B and the body conductor 87. The end cap 70' include a wire or other conductor 89 that is electrically coupled to the first interlock terminal 96A', and that extends outside of or beyond the body 80'. Similar reference numbers are used in FIG. 4 to identify features of the end cap 70' that are similar to or the same as corresponding features of the end cap 70.

Figure 5:
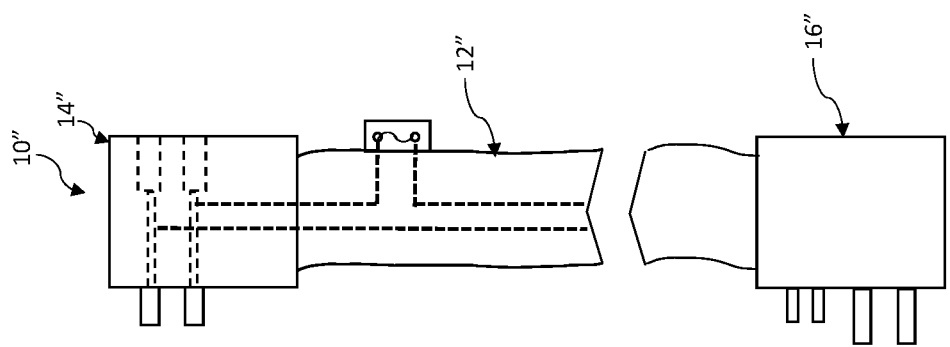
FIG. 5 is a diagrammatic illustration of an electrical interconnect in accordance with embodiments.

FIG. 5 is a diagrammatic illustration of a cable 12" and connector 14" in accordance with embodiments that do not have HVIL components or features. As shown, the cable 12" may be substantially the same as or similar to the cable 12 described above in connection with FIG. 1, but does not include the first and second interlock conductors 50A and 50B. The connector 14" may be substantially the same as or similar to the connector 14 described above in connection with FIGS. 1 and 2, but does not include HVIL components of features such as the terminals 56A, 56B, 58A, 58B and the body connector 57B associated with the HVIL functionality. Similar reference numbers are used in FIG. 5 to identify features of the connector 14″ that are similar to or the same as corresponding features of the connector 14.

Figure 6:
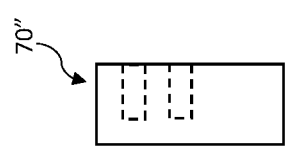
FIG. 6 is a diagrammatic illustration of an end cap in accordance with embodiments.

FIG. 6 is a diagrammatic illustration of an end cap 70″ in accordance with embodiments. End cap 70″ is configured for use with connectors such as 14″ that do not include integral HVIL components or features. As shown, end cap 70″ may be substantially the same as or similar to the end cap 70 described above in connection with FIG. 2, but does not include the components or features associated with the HVIL functionality such as the first and second interlock terminals 96A and 96B and the body conductor 87. Similar reference numbers are used in FIG. 6 to identify features of the end cap 70″ that are similar to or the same as corresponding features of the end cap 70.

Figure 7:
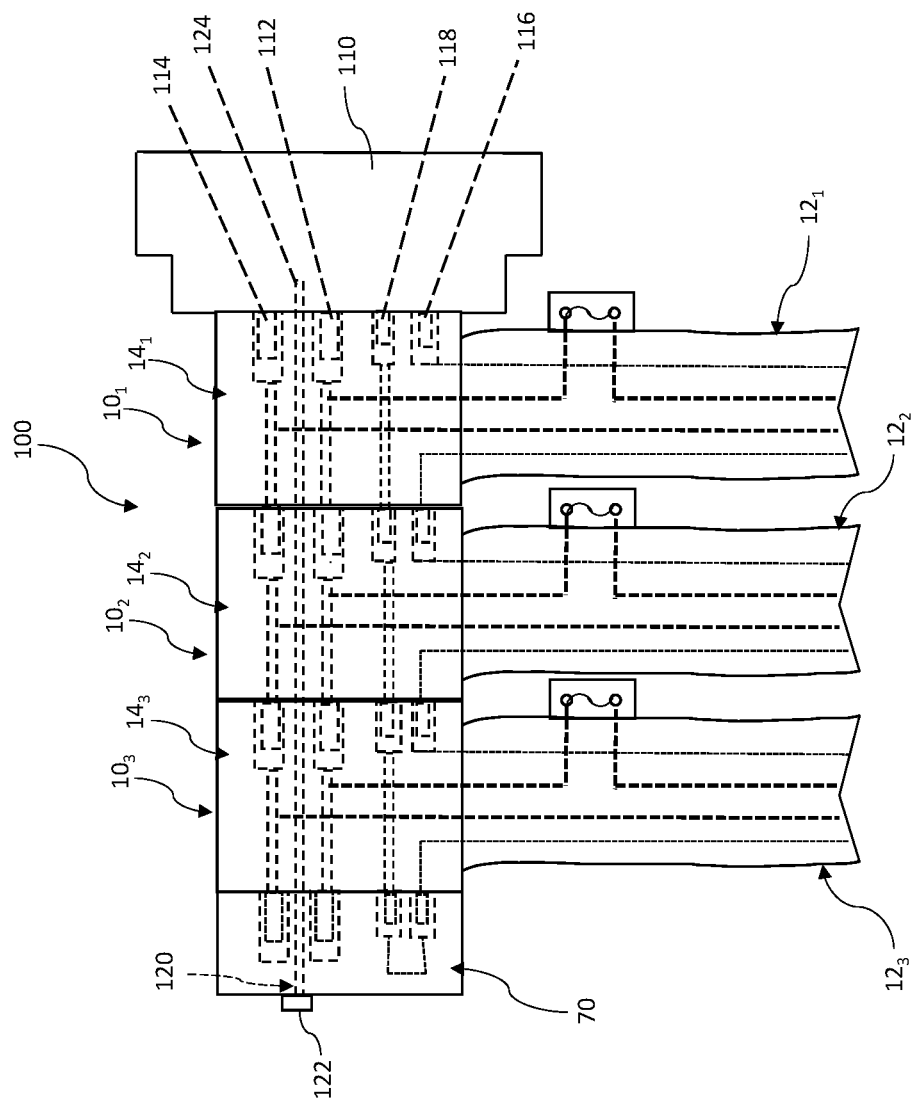
FIG. 7 is a diagrammatic illustration of a bus including electrical interconnects and an end cap, in accordance with embodiments.

FIG. 7 is a diagrammatic illustration of a bus 100 including a plurality of interconnects $10_1$, $10_2$ and $10_3$ stacked together. Although bus 100 includes three stacked interconnects $10_1$-$10_3$, other embodiments include more or fewer such interconnects. Each of the interconnects $10_1$, $10_2$ and $10_3$ can be substantially the same as or similar to the interconnect 10 described above in connection with FIG. 1 (e.g., the internal return HVIL embodiments) and includes a respective cable $12_1$, $12_2$ and $12_3$, and connector $14_1$, $14_2$ and $14_3$. Adjacent connectors $14_1$ and $14_2$, and adjacent connectors $14_2$, and $14_3$, are mechanically and electrically connected to one another. In particular, the first side $32_2$ of connector $14_2$ is mated with and mechanically connected to the second side $34_1$ of the connector $14_1$, and the power terminals $36A_2$, $36B_2$ and interlock terminals $56A_2$, $56B_2$ of the connector $14_2$ are electrically coupled to the respective power terminals $38A_1$, $38B_1$ and interlock terminals $58A_1$, $58B_1$ of the connector $14_1$. Similarly, the first side 323 of connector $14_3$ is mated with and mechanically connected to the second side $34_2$ of the connector $14_2$, and the power terminals $36A_3$, $36B_3$ and interlock terminals $56A_3$, $56B_3$ of the connector $14_3$ are electrically coupled to the respective power terminals $38A_2$, $38B_2$ and interlock terminals $58A_2$, $58B_2$ of the connector $14_2$. By this stacked arrangement, the cables $12_1$, $12_2$ and $12_3$, are electrically connected to one another in a parallel electrical circuit (e.g., power conductors $20A_1$, $20A_2$ and $20A_3$, are electrically coupled to one another, and power conductors $20B_1$, $20B_2$ and $20B_3$, are electrically coupled to one another).

End cap 70 is connected to the bus 100 in the embodiments shown in FIG. 7. In particular, end cap 70 is mechanically mounted to and engages the second side $34_3$ of the connector $14_3$ (e.g., the last connector in the stack). As shown, the first and second interlock terminal 96A and 96B of the end cap 70 are electrically coupled to the first and second interlock terminals $58A_3$ and $58B_3$, respectively, of the connector $14_3$. The end cap 70 thereby electrically couples the body connector $57B_3$ of the connector $14_3$, which provides the internal return HVIL functionality of the connector, to the second interlock conductor $50B_3$ of the interconnect $10_3$. The first and second power terminals $38A_3$ and $38B_3$ of the connector $14_3$ are accommodated by the end cap 70, and are electrically isolated from one another by the end cap.

In the embodiments illustrated in FIG. 7, the bus 100 is mounted to a base plate 110, which may, for example, be a component of an electric vehicle (e.g., in a high voltage junction box) (not shown in FIG. 7). The first side 321 of the connector $14_1$ (e.g., the first connector in the stack) is mounted to the base plate 110 in the illustrated embodiments. The embodiments of the base plate 110 shown in FIG. 7 include projections 112, 114, 116 and 118 that are located and configured to receive the first and second power terminals $36A_1$ and $36B_1$ and the first and second interlock terminals $56A_1$ and $56B_1$, respectively, of the connector $14_1$. The projections 112, 114, 116 and 118 thereby provide structures enabling the bus 100 to be mounted and secured to the base plate 110 (e.g., the connector $14_1$ plugs into the base plate). Alternatively or additionally, and as shown in FIG. 7, a fastener such as a screw or a bolt 120 including a head $12_2$ and shaft 124 may be used to secure the bus 100 to the base plate 110. In the illustrated embodiments, the adjacent connectors $14_1$ and $14_2$, adjacent connectors $14_2$, and $14_3$, and adjacent connector $14_3$ and end cap 70, may be at least partially mechanically coupled by the engagement of the plug-type power and interlock terminals. Alternatively or additionally, other structures such as clips or snaps (not shown) on one or more of the connectors $14_1$, $14_2$ and $14_3$ and end cap 70 may be included to mechanically join the connectors and end cap. Similarly, alternatively or additionally, other structures such as clips or snaps (not shown) on one or more of the connector $14_1$ and the base plate 110 may be included to mechanically join the connector to the base plate.

Figure 8:
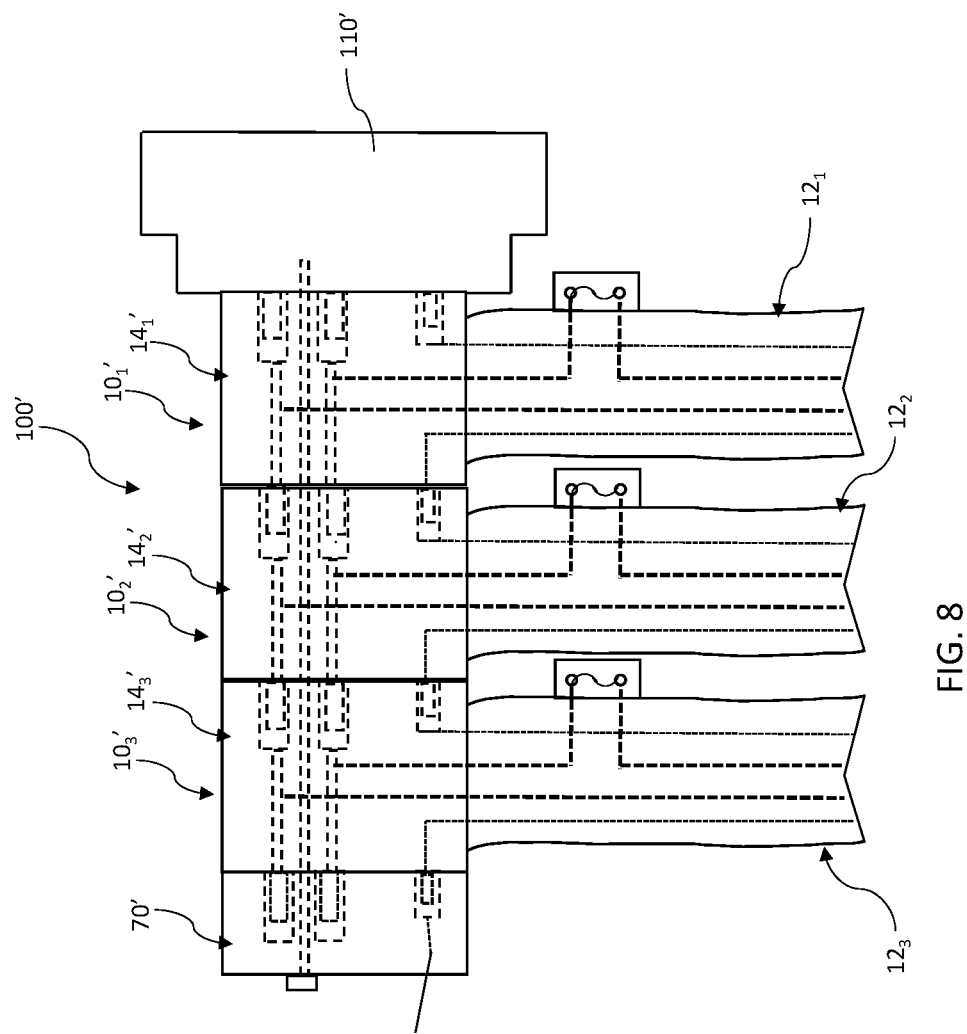
FIG. 8 is a diagrammatic illustration of a bus including electrical interconnects and an end cap, in accordance with embodiments.

FIG. 8 is a diagrammatic illustration of a bus 100′ including a plurality of interconnects $10_1'$, $10_2'$ and $10_3'$ stacked together and mounted to a base plate 110′. Although bus 100′ includes three stacked interconnects $10_1'$-$10_3'$, other embodiments include more or fewer such interconnects. Each of the interconnects $10_1'$, $10_2'$ and $10_3'$ can be substantially the same as or similar to the interconnect 10′ described above in connection with FIG. 3 (e.g., the external return HVIL embodiments) and includes a respective cable $12_1$, $12_2$ and $12_3$, and connector $14_1'$, $14_2'$ and $14_3'$. By this stacked arrangement, the cables $12_1$, $12_2$ and $12_3$, are electrically connected to one another in a parallel configuration. End cap 70′ is connected to the bus 100′ in the embodiments shown in FIG. 8, and the conductor 89 provides access for coupling to an external HVIL return (not shown).

Figure 9:
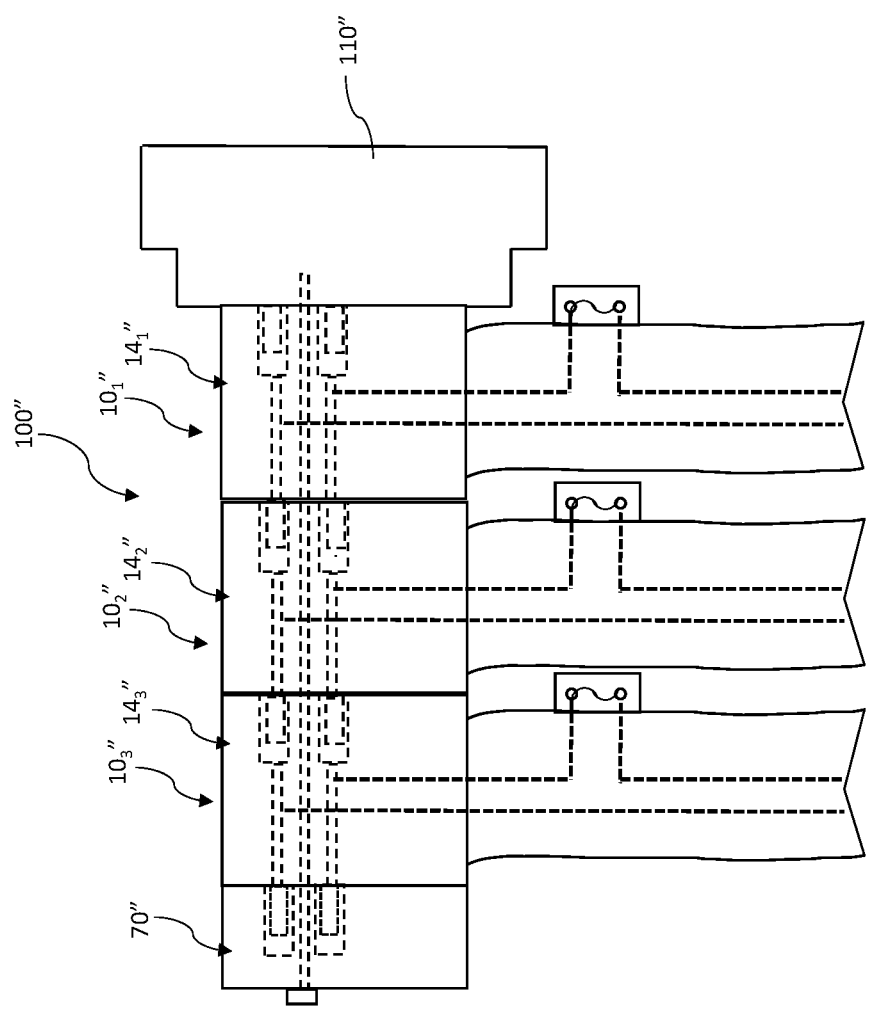
FIG. 9 is a diagrammatic illustration of a bus including electrical interconnects and an end cap, in accordance with embodiments.

FIG. 9 is a diagrammatic illustration of a bus 100″ including a plurality of interconnects $10_1''$, $10_2''$ and $10_3''$ stacked together. Although bus 100″ includes three stacked interconnects $10_1''$-$10_3''$, other embodiments include more or fewer such interconnects. Each of the interconnects $10_1''$, $10_2''$ and $10_3''$ can be substantially the same as or similar to the interconnect 10″ described above in connection with FIG. 5 (e.g., embodiments without integral HVIL components) and includes a respective cable $12_1''$, $12_2''$, and $12_3''$, and connector $14_1''$, $14_2''$ and $14_3''$. By this stacked arrangement, the cables $12_1''$, $12_2''$ and $12_3''$ are electrically connected to one another in a parallel configuration. End cap 70″ is connected to the bus 100′ in the embodiments shown in FIG. 9, to cover the first and second power terminals $38A_3''$ and $38B_3''$ of the connector $14_3''$.

Interconnects such as 10, 10′ and/or 10″ can be provided in sets, where one or more than one of the interconnects have different length cables 12, 12′ or 12″, respectively. Sets of these types may effectively include standard interconnects having a variety of cable lengths. Such sets of interconnects 10, 10′ and/or 10″ can be stocked (e.g., by original equipment manufacturers (OEM)) and selected and configured into particular applications. Similarly, fasteners such as bolts 120 sized or otherwise configured to join different number of connectors such as 14, 14′ and/or 14″ to base plates such as 110, 110′, or 110″ can be stocked. Design flexibility and the efficiency of product build-out can be enhanced by the use of such sets of modular interconnects and fasteners.

Figure 10:
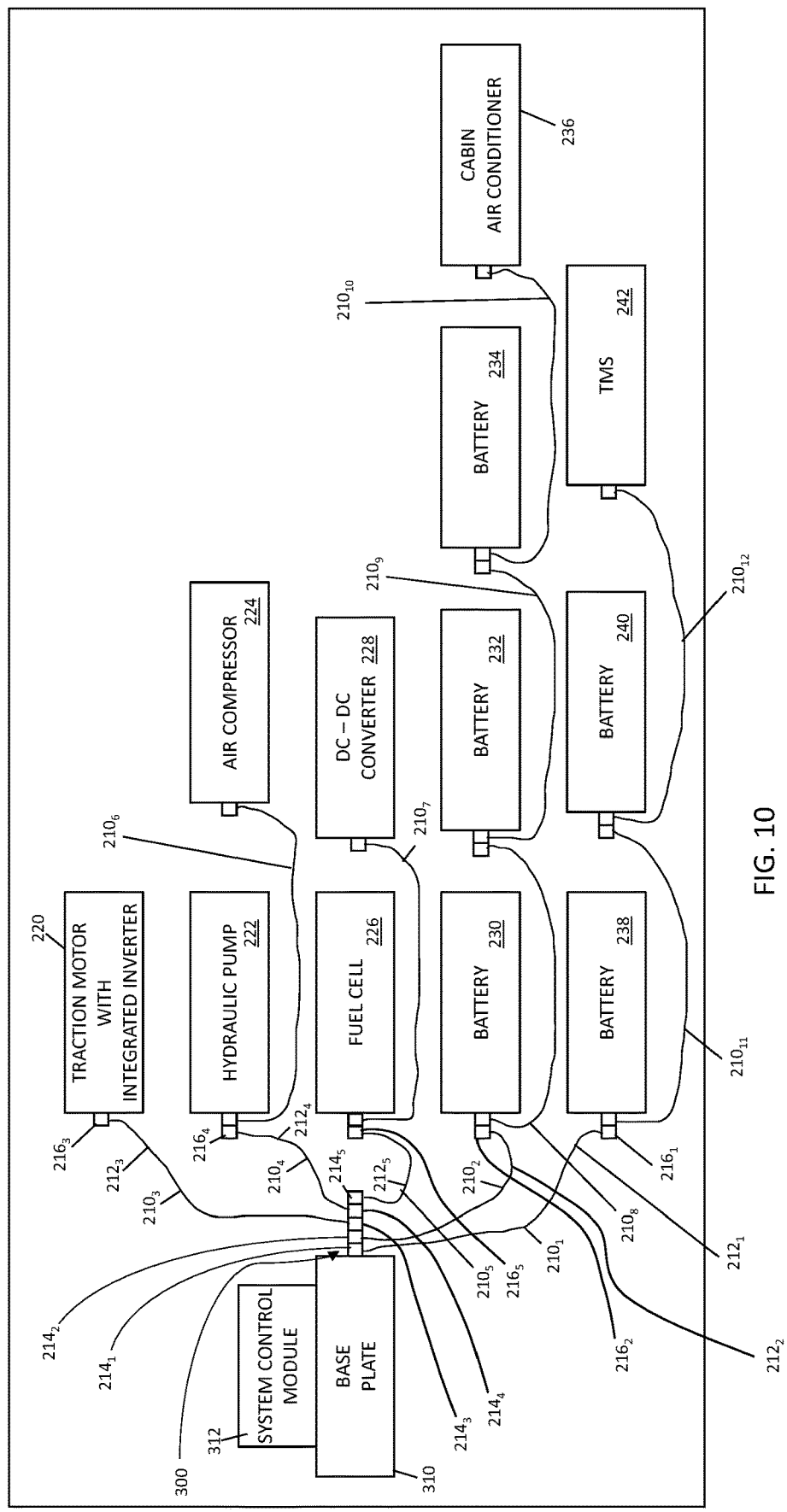
FIG. 10 is a diagrammatic illustration of a vehicle and electrical system including buses, in accordance with embodiments.

FIG. 10, for example, is a diagrammatic illustration of an electrical system 200 of an electric vehicle 202 that includes exemplary electrical components 204 electrically coupled by interconnects $210_1$-$210_{12}$. The electrical components 204 in the illustrated embodiments include a traction motor with integrated inverter 220, hydraulic pump 222, air compressor 224, fuel cell 226, DC-DC converter 228, batteries 230, 232, 234, 238 and 240, cabin air conditioner 236 and thermal management system (TMS) 242. Other embodiments include other electrical components. Each of the interconnects $210_1$-$210_{12}$ can be the same as or similar to one of the interconnects 10, 10' and/or 10" described above, and may have cables of one or more different lengths (cables $212_1$-$212_5$ of interconnects $210_1$-$210_5$ are labeled for purposes of example). As shown, a number of the interconnects $210_1$-$210_{12}$ are connected to others of the interconnects to form buses. For purposes of example, the respective connectors $214_1$-$214_5$, $216_1$-$216_5$ and cables $212_1$-$212_5$ of the interconnects $210_1$-$210_5$ are labeled in FIG. 10. As shown, a bus 300 is formed by the stacked connectors $214_1$-$214_5$ of the interconnects $210_1$-$210_5$. Other buses are also shown (but not labeled) in FIG. 10. Bus 300 is shown mounted to a base plate 310. A system control module (SCM) 312 can control the components 204 in a conventional or otherwise known manner. In embodiments, the SCM 312 is coupled to one or more of the buses of the electrical system 200, such as for example to the bus 300.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

What is claimed is:

1. One or more electrical interconnects for coupling electrical components in an electric vehicle, each of the one or more electrical interconnects comprising:
   a cable including first and second ends and first and second power conductors; and
   a first connector on the first end of the cable, the first connector including:
      a first body having first and second sides;
      first and second first side power terminals on the first side of the first body; and
      first and second second side power terminals on the second side of the first body,
         wherein the first second side power terminal is electrically coupled to the first first side power terminal and to the first power conductor, and the second second side power terminal is electrically coupled to the second first side power terminal and to the second power conductor; and
   wherein the first side of the first body and the first and second first side power terminals are complimentary to the second side of the first body and the first and second second side power terminals so the first connector is configured to be mechanically and electrically connected to a first connector of another of the one or more electrical interconnects on one or both of the first or second sides of the first body;
   wherein each of the one or more electrical interconnects further comprises a second connector on the second end of the cable, the second connector including:
      a second body having first and second sides;
      first and second first side power terminals on the first side of the second body; and
      first and second second side power terminals on the second side of the second body, wherein the first second side power terminal is electrically coupled to the first first side power terminal and to the first power conductor, and the second second side power terminal is electrically coupled to the second first side power terminal and to the second power conductor; and
   wherein the first side of the second body and the first and second first side power terminals are complimentary to the second side of the second body and the first and second second side power terminals so the second connector is configured to be mechanically and electrically connected to a first connector of another of the one or more electrical interconnects on one or both of the first or second sides of the second body.

2. The one or more electrical interconnects of claim 1, where two or more of the plurality of electrical interconnects comprise cables having different lengths.

3. The one or more electrical interconnects of claim 1, wherein for each of the one or more electrical interconnects:
   the cable further includes first and second interlock conductors;
   the first connector further includes:
      a first first side interlock terminal on the first side of the first body and electrically coupled to the first interlock conductor; and
      a first second side interlock terminal on the second side of the first body and electrically coupled to the second interlock conductor; and
      wherein the first first side interlock terminal of the first connector is complimentary to the first second side interlock terminal of the first connector; and
   the second connector further includes:
      a first first side interlock terminal on the first side of the second body and electrically coupled to the first interlock conductor; and
      a first second side interlock terminal on the second side of the second body and electrically coupled to the second interlock conductor; and
   wherein the first first side interlock terminal of the second connector is complimentary to the first second side interlock terminal of the second connector.

4. The one or more electrical interconnects of claim 3, where two or more of the plurality of electrical interconnects comprise cables having different lengths.

5. The one or more electrical interconnects of claim 3 and further comprising one or more end caps, each end cap of the one or more end caps is configured to be mounted to the second side of the first and/or second body of one or both of the first and second connectors, and wherein each end cap of the one or more end caps includes:
   a cap body having first and second opposite sides;
   a first interlock terminal on the first side of the cap body, wherein the first interlock terminal is located to electrically couple to the first second side interlock terminal of one or both of the first or second connectors; and
   a second interlock terminal on a second side of the cap body and electrically coupled to the first interlock terminal.

6. The one or more electrical interconnects of claim 3, wherein for each of the one or more electrical interconnects:

the first connector further includes:
  a second first side interlock terminal on the first side of the first body; and
  a second second side interlock terminal on the second side of the first body and electrically coupled to the second first side interlock terminal; and
  wherein the second first side interlock terminal of the first connector is complimentary to the second second side interlock terminal of the first connector; and
the second connector further includes:
  a second first side interlock terminal on the first side of the second body; and
  a second second side interlock terminal on the second side of the second body and electrically coupled to the second first side interlock terminal; and
  wherein the second first side interlock terminal of the second connector is complimentary to the second second side interlock terminal of the second connector.

7. A set of a plurality of the one or more electrical interconnects of claim 6, where two or more of the plurality of electrical interconnects comprise cables having different lengths.

8. The one or more electrical interconnects of claim 6 and further comprising one or more end caps, each end cap of the one or more end caps is configured to be mounted to the second side of the first and/or second body of one or both of the first and second connectors, and wherein each end cap of the one or more end caps includes:
  a cap body having first and second opposite sides;
  a first interlock terminal on the first side of the cap body, wherein the first interlock terminal is located to electrically couple to the first second side interlock terminal of one or both of the first or second connectors; and
  a second interlock terminal on the first side of the cap body and electrically coupled to the first interlock terminal, wherein the second interlock terminal is located to electrically couple to the second second side interlock terminal of one or both of the first or second connectors.

9. One or more electrical interconnects for coupling electrical components in an electric vehicle, each of the one or more electrical interconnects comprising:
  a cable including first and second ends and first and second power conductors; and
  a first connector on the first end of the cable, the first connector including:
    a first body having first and second sides;
    first and second first side power terminals on the first side of the first body; and
    first and second second side power terminals on the second side of the first body,
      wherein the first second side power terminal is electrically coupled to the first first side power terminal and to the first power conductor, and the second second side power terminal is electrically coupled to the second first side power terminal and to the second power conductor; and
    wherein the first side of the first body and the first and second first side power terminals are complimentary to the second side of the first body and the first and second second side power terminals so the first connector is configured to be mechanically and electrically connected to a first connector of another of the one or more electrical interconnects on one or both of the first or second sides of the first body;
  wherein for each of the one or more electrical interconnects:
    the cable further includes first and second interlock conductors;
    the first connector further includes:
      a first first side interlock terminal on the first side of the first body and electrically coupled to the first interlock conductor; and
      a first second side interlock terminal on the second side of the first body and electrically coupled to the second interlock conductor; and
      wherein the first first side interlock terminal of the first connector is complimentary to the first second side interlock terminal of the first connector.

10. The one or more electrical interconnects of claim 9, where two or more of the plurality of electrical interconnects comprise cables having different lengths.

11. The one or more electrical interconnects of claim 9, further comprising a second connector, the second connector including:
  a second body having first and second sides;
  first and second first side power terminals on the first side of the second body;
  first and second second side power terminals on the second side of the second body;
    wherein the first second side power terminal is electrically coupled to the first first side power terminal and to the first power conductor, and the second second side power terminal is electrically coupled to the second first side power terminal and to the second power conductor; and
    wherein the first side of the second body and the first and second first side power terminals are complimentary to the second side of the second body and the first and second second side power terminals so the second connector is configured to be mechanically and electrically connected to a first connector of another of the one or more electrical interconnects on one or both of the first or second sides of the second body.

12. The one or more electrical interconnects of claim 11, wherein the second connector further includes:
  a first first side interlock terminal on the first side of the second body and electrically coupled to the first interlock conductor; and
  a first second side interlock terminal on the second side of the second body and electrically coupled to the second interlock conductor;
    wherein the first first side interlock terminal of the second connector is complimentary to the first second side interlock terminal of the second connector.

13. The one or more electrical interconnects of claim 12, wherein for each of the one or more electrical interconnects:
  the first connector further includes:
    a second first side interlock terminal on the first side of the first body; and
    a second second side interlock terminal on the second side of the first body and electrically coupled to the second first side interlock terminal; and
    wherein the second first side interlock terminal of the first connector is complimentary to the second second side interlock terminal of the first connector; and
  the second connector further includes:
    a second first side interlock terminal on the first side of the second body; and
    a second second side interlock terminal on the second side of the second body and electrically coupled to the second first side interlock terminal; and wherein the second first side interlock terminal of the second connector is complimentary to the second second side interlock terminal of the second connector.

14. The one or more electrical interconnects of claim 13, where two or more of the plurality of electrical interconnects comprise cables having different lengths.

15. An electrical system for an electric vehicle, comprising:
a plurality of vehicle electrical components; and
one or more electrical interconnects connected to each of the plurality of vehicle electrical components, wherein each electrical interconnect comprises:
a cable including first and second ends and first and second power conductors; and
a first connector on the first end of the cable, the first connector including: a first body having first and second sides;
first and second first side power terminals on the first side of the first body; and
first and second second side power terminals on the second side of the first body, wherein the first second side power terminal is electrically coupled to the first first side power terminal and to the first power conductor, and the second second side power terminal is electrically coupled to the second first side power terminal and to the second power conductor; and
wherein the first side of the first body and the first and second first side power terminals are complimentary to the second side of the first body and the first and second second side power terminals so the first connector is configured to be mechanically and electrically connected to a first connector of another of the one or more electrical interconnects on one or both of the first or second sides of the first body; and
wherein at least a portion of the plurality of vehicle electrical components are coupled to a bus including a plurality of the first connectors mechanically and electrically connected to one another.

16. The electrical system of claim 15, wherein at least a portion of the one or more electrical interconnects have cables of different lengths.

17. The electrical system of claim 15, wherein at least a portion of the one or more electrical interconnects comprises a second connector on the second end of the cable, the second connector including:
a second body having first and second sides;
first and second first side power terminals on the first side of the second body; and
first and second second side power terminals on the second side of the second body, wherein the first second side power terminal is electrically coupled to the first first side power terminal and to the first power conductor, and the second second side power terminal is electrically coupled to the second first side power terminal and to the second power conductor; and
wherein the first side of the second body and the first and second first side power terminals are complimentary to the second side of the second body and the first and second second side power terminals so the second connector is configured to be mechanically and electrically connected to a first connector of another of the one or more electrical interconnects on one or both of the first or second sides of the second body; and
wherein at least a portion of the plurality of vehicle electrical components are coupled to a bus including a plurality of second connectors mechanically and electrically connected to one another.

18. The electrical system of claim 17, wherein for at least a portion of the one or more electrical interconnects:
the cable further includes first and second interlock conductors;
the first connector further includes:
a first first side interlock terminal on the first side of the first body and electrically coupled to the first interlock conductor; and
a first second side interlock terminal on the second side of the first body and electrically coupled to the second interlock conductor; and
wherein the first first side interlock terminal of the first connector is complimentary to the first second side interlock terminal of the first connector; and the second connector further includes:
a first first side interlock terminal on the first side of the second body and electrically coupled to the first interlock conductor; and
a first second side interlock terminal on the second side of the second body and electrically coupled to the second interlock conductor; and
wherein the first first side interlock terminal of the second connector is complimentary to the first second side interlock terminal of the second connector.

19. The electrical system of claim 18, wherein for at least a portion of the one or more electrical interconnects:
the first connector further includes:
a second first side interlock terminal on the first side of the first body; and
a second second side interlock terminal on the second side of the first body and electrically coupled to the second first side interlock terminal; and
wherein the second first side interlock terminal of the first connector is complimentary to the second second side interlock terminal of the first connector; and
the second connector further includes:
a second first side interlock terminal on the first side of the second body; and
a second second side interlock terminal on the second side of the second body and electrically coupled to the second first side interlock terminal; and
wherein the second first side interlock terminal of the second connector is complimentary to the second second side interlock terminal of the second connector.

20. The electrical system of claim 19, wherein at least a portion of the one or more electrical interconnects have cables of different lengths.

* * * * *